United States Patent

[11] 3,632,086

| [72] | Inventor | Erich Mai<br>Freudenberg am Main-Kirschfurt, Germany |
|---|---|---|
| [21] | Appl. No. | 38,939 |
| [22] | Filed | May 20, 1970 |
| [45] | Patented | Jan. 4, 1972 |
| [73] | Assignee | Josef Haamann Freudenberger Winden-<br>und Hebezeugfabrik<br>Freudenberg am Main-Kirschfurt, Germany |
| [32] | Priority | May 22, 1969 |
| [33] | | Germany |
| [31] | | P 19 26 161.1 |

[54] LANDING GEAR FOR SEMITRAILERS OR THE LIKE
10 Claims, 2 Drawing Figs.

[52] U.S. Cl. ................................................. 254/86 R
[51] Int. Cl. ................................................. B60s 9/02
[50] Field of Search ................................................. 254/86 R;
74/424.8; 280/475

[56] References Cited
UNITED STATES PATENTS

| 2,417,619 | 3/1947 | Seyferth ..................... | 254/86 |
| 3,747,422 | 5/1956 | Walther ..................... | 254/86 X |
| 3,259,364 | 7/1966 | Hulverson ..................... | 254/86 |

*Primary Examiner*—Andrew R. Juhasz
*Assistant Examiner*—David R. Melton
*Attorney*—Michael S. Striker

ABSTRACT: A landing gear for semitrailers or the like wherein the mechanisms which move the landing wheels up and down receive motion from a hollow output shaft which can be driven at two speeds in response to rotation of an input shaft. The latter is axially movably received in and extends beyond the ends of the output shaft, and each of its ends can be engaged and rotated by a crank handle or the like so that the landing gear can be manipulated from either side of the vehicle. In one of its axial positions, the input shaft is directly coupled to and rotates the output shaft. In another axial position, the input shaft rotates the output shaft by way of a step-down transmission.

3,632,086

Inventor
ERICH MAI

By: Michael S. Striker
Attorney 3,632,086

LANDING GEAR FOR SEMITRAILERS OR THE LIKE

BACKGROUND OF THE INVENTION

The present invention relates to improvements in landing gears for vehicles, particularly for semitrailers.

A landing gear for semitrailers normally comprises two landing wheels and two jacks, hoists or like mechanisms which can move the respective wheels into and away from engagement with the ground. The two mechanisms are connected to each other by a shaft and one of the mechanisms is associated with a two-speed transmission which can move the one mechanism at a lower speed (e.g., during lifting of the semitrailer) or at a higher speed (e.g., during retraction). The shaft receives torque from the transmission and operates the other mechanism. A crank handle is used to rotate the input member of the transmission. A drawback of such landing gears is that the transmission can be operated only from one side of the semitrailer; this involves danger to the operator if the crank handle can be reached only at the side which is adjacent to a traffic lane.

It is also known to provide a landing gear with two transmissions, one for each landing wheel. This enables the operator to move the landing wheels from either side of the vehicle. However, such landing gears also exhibit a number of drawbacks; for example, simple stepdown gear transmissions are incapable of furnishing a satisfactory speed ratio as well as a satisfactory transmission of torque. Furthermore, it is customary in such transmissions that the direction of rotation must be reversed in order to change from operation at low speed to operation at high speed, or vice versa. Since the transmission of torque in such transmissions is unsatisfactory, it is often necessary to employ two persons, each at a different side of the vehicle so that one person is likely to be injured by oncoming or passing vehicles. Finally, the two transmissions contribute excessively to the cost and bulk of the landing gear.

SUMMARY OF THE INVENTION

An object of the invention is to provide a novel and improved landing gear which employs a single multispeed transmission but enables the operator to raise or lower the landing wheels from either side of the vehicle.

Another object of the invention is to provide a relatively simple, compact, inexpensive and rugged landing gear which can be used on semitrailers and/or many other types of vehicles, which can be manipulated without danger to the operator, and which employs a relatively simple transmission.

A further object of the invention is to provide a novel and improved torque-transmitting connection between the shaft which drives the mechanisms for the landing wheels and the input member of the transmission.

An additional object of the invention is to provide a landing gear which can be installed on new as well as on used vehicles.

The improved landing gear can be used on many types of vehicles, particularly on semitrailers, and comprises tow supporting members (e.g., single or twin wheels), two discrete mechanisms each operative to move the respective supporting member into and away from engagement with the ground and each having a rotary-driven portion, a hollow rotary output shaft operatively connected with the driven portions of both mechanisms, an input shaft axially movably received in and extending beyond the ends of the output shaft, a multispeed transmission arranged to respectively provide a lower speed and a higher speed torque-transmitting connection between the shafts in first and second axial positions of the input shaft, and one or two crank handles, wheels or other suitable means for rotating the input shaft.

The novel features which are considered as characteristic of the invention are set forth in particular in the appended claims.

The improved landing gear itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
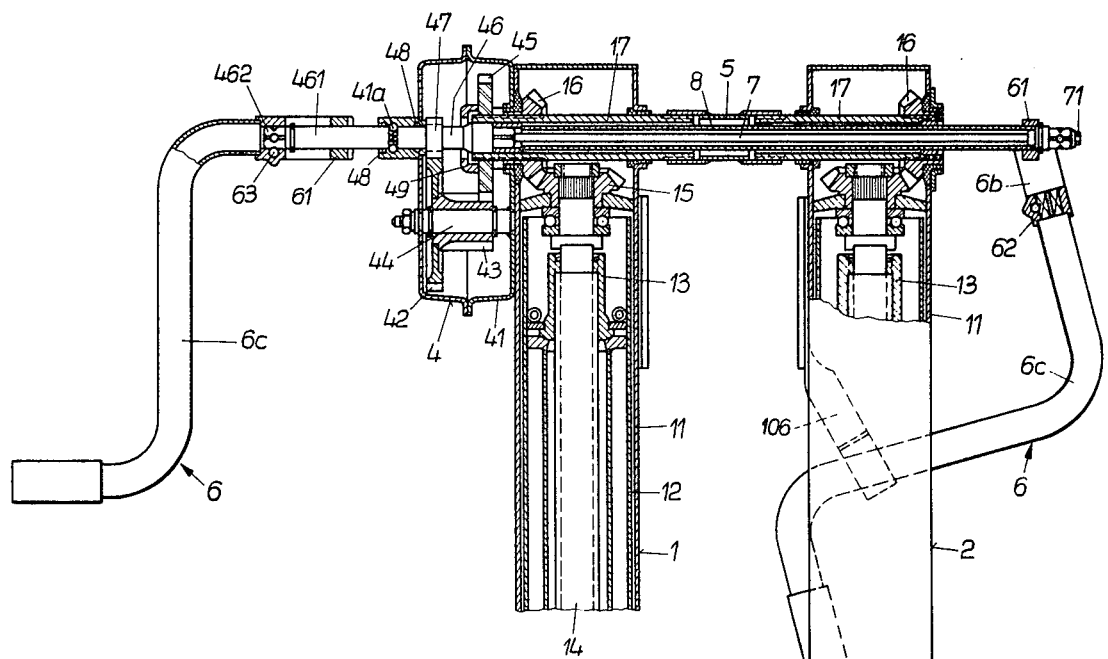
FIG. 1 is a fragmentary partly elevational and partly sectional view of a landing gear which embodies the invention.

Referring first to FIG. 1, there is shown a landing gear for vehicles, particularly for semitrailers, which comprises two supporting members in the form of twin landing wheels 3 (only one shown), two discrete mechanisms 1, 2 each operative to move one of the landing gears 3 into and away from engagement with the ground, a hollow rotary output shaft 17 which extends transversely of and at a level below the frame of a semitrailer (not shown), an input shaft 46 which is axially movably received in the output shaft 17 and whose end portions extend beyond the respective ends of the shaft 17, a pair of crank handles 6 each connected to one end portion of the input shaft 46 and enabling the driver or another person to rotate the shaft 46 from the respective side of the semitrailer, and a multispeed transmission 4 whose case 41 is supported by the mechanism 1.

Each of the mechanisms 1, 2 comprises a driven portion here shown as a bevel gear 16 which is fixed to the output shaft 17, a tubular outer leg 11 which is mounted on the frame of the semitrailer, a tubular inner leg 12 which is telescoped into the outer leg 11 and whose lower end portion carries the shaft for the respective landing wheel 3, a feed screw or spindle 14 which is rotatably mounted in the outer leg 11 but is held against axial movement, a second bevel gear 15 which is rigidly connected with the spindle 14 and meshes with the respective bevel gear 16 on the output shaft 17, and a spindle nut 13 which meshes with the spindle 14 and is connected with the inner leg 12. The arrangement is such that, when the output shaft 17 rotates the bevel gears 16, the bevel gears 15 rotate the feed screws 14 whereby the inner legs 12 move up or down, depending on the direction of rotation of the output shaft 17. The inner legs 12 cannot rotate in the respective outer legs 11. The output shaft 17 comprises two sections which are respectively journaled in the outer legs 11 of the mechanisms 1, 2 and are connected to each other by a coupling sleeve 5 whose axial length depends on the width of the semitrailer frame and on the desired distance between the outer legs 11.

The case 41 of the transmission 4 comprises two mirror symmetrical shells one of which is welded or otherwise secured to the outer leg 11 of the mechanism 1. The left-hand end portion of the outer shaft 17 extends into the case 41 and carries a gear 45 which is in permanent mesh with a pinion 43 provided on an intermediate shaft 44. The pinion 43 is rigidly connected with a gear 42 which meshes with a gear 47 when the input shaft 46 assumes the axial position shown in FIG. 1. The gear 47 is fixed to the input shaft 46 and is movable therewith axially to the position shown in FIG. 2 in which it engages with and can rotate a socket or internal gear 49 of the gear 45 on the output shaft 17. The internal gear 49 of the gear 45 then forms with the gear 47 a coupling which establishes a direct torque-transmitting connection between the input shaft 46 and output shaft 17.

A sleeve 41a of the left-hand shell of the transmission case 41 is provided with two axially spaced pairs of detent notches 48 each of which can receive spring-biased balls 48' carried by the input shaft 46. These balls cooperate with the notches 48 to yieldably hold the input shaft 46 in the position shown in FIG. 1 or 2. When the input shaft 46 assumes the axial position of FIG. 1 so that its gear 47 meshes with the gear 42 on the intermediate shaft 44, and the driver rotates the input shaft by way of one of the crank handles 6, the output shaft 17 and the bevel gears 16 rotate at a lower speed because the gear 45 is driven by way of the gears 47, 42 and 43. When the input shaft 46 is shifted to the axial position in FIG. 2, the output shaft 17 can be rotated at a higher speed, namely, at the speed of the input shaft 46, because the latter's gear 47 engages the internal gear 49 on the gear 45.

The crank arms 6 can be permanently o9 separably connected with the respective end portions of the input shaft 46. As shown in the left-hand portion of FIG. 1 and also in FIG. 2, the left-hand crank handle 6 is slipped onto the left-hand end portion 461 of the input shaft 46 whose outermost end 462 is of square or other polygonal outline and is received in a complementary portion of the handle 6. The latter is provided with a spring-biased ball 63 which then extends into a detent notch of the end 462 to yieldably hold the handle against axial movement with reference to the shaft 46. Thus, the input shaft 46 can be moved axially by way of the crank handle 6 and this crank handle also serves to rotate the input shaft to thereby rotate the output shaft 17 at a higher or lower speed, depending on the axial position of the gear 47.

The right-hand portion of FIG. 1 shows that the crank handle 6 is pivotally secured to the respective end portion of the input shaft 46. Each crank handle 6 has a ring-shaped member 6a which is slidable along the respective end portion of the shaft 46 and is pivotally connected to two arms 6b (only one shown) which connect it to the main portion 6c of the handle 6. The main portion 6c has a rectangular socket 62 which can receive the polygonal end 462 of the input shaft 46 and which is also provided with the spring-biased ball 63 adapted to enter a detent notch in the end 462 when the handle 6 is moved to extended or operative position corresponding to that of the left-hand handle. A retainer 106 is secured to each outer leg 11 to hold the respective handle 6 in the retracted or collapsed position. In order to move a handle 6 to extended position, the driver pivots the arms 6b so as to move the socket 62 into registry with the end 462 and the main portion 6c is then pushed toward the outer leg 11 of the mechanism 1 or 2 so that the socket 62 receives the end 462 and the ball 63 snaps into the adjacent detent notch. The crank handle 6 is then ready to rotate and to move axially with the input shaft 46.

As shown in FIG. 1, the input shaft 46 comprises a solid rod-shaped portion which carries the gear 47 and includes the left-hand end portion 461, a hollow cylindrical portion 8 which extends through and to the right beyond the output shaft 17, and a tension rod 7 which is received in the cylindrical portion 8 and serves as a means for increasing its resistance to torsional stresses. The left-hand end of the tension rod 7 is threadedly connected with the rod-shaped portion of the input shaft 46 and its right-hand end carries a nut 71 which causes a washer to bear against the right-hand end face of the cylindrical portion 8. The left-hand end 61 of the cylindrical portion 8 is of polygonal internal cross-sectional outline and is slipped onto a polygonal part 462" of the solid rod-shaped portion of the input shaft 46 (see FIG. 2) The length of the torsion bar 7 and cylindrical portion 8 depends on the desired overall length of the input shaft 46 and on the width of the semitrailer. It was found that the weight of the input shaft 46 is considerably less than the weight of a solid shaft of identical length and that the rod 7 enables the cylindrical portion 8 to withstand very high torsional stresses. Thus, the cylindrical portion 8 can be rotated by the right-hand crank handle 6 to drive the gear 47 regardless of whether the gear 47 meshes with the gear 42 or with the internal gear 49. It is clear that the cylindrical portion 8 and tension rod 7 can be omitted if the landing gear is to be provided with a single crank handle, namely, with the left-hand crank handle 6 of fIG. 1.

Figure 2:
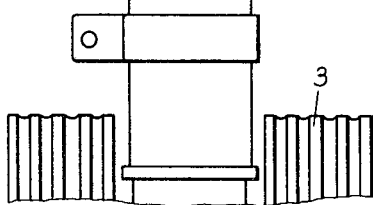
FIG. 2 illustrates a portion of the structure shown in FIG. 1 but with the input shaft in a different axial position.

An advantage of the aforedescribed articulate connections between the crank handles 6 and the input shaft 46 is that the handles can be used to rotate the input shaft as well as to move the input shaft axially between the positions shown in FIGS. 1 and 2. The detent means including the balls 63 are strong enough to establish a satisfactory connection which enables the driver or another person to shift the input shaft 46 axially by way of the respective crank handle 6. The axial position of the input shaft 46 can be determined at either side of the vehicle so that the operator knows whether or not the shaft 46 must be moved axially prior to rotation. Since the ends of the input shaft 46 are accessible at both sides of the vehicle, the manipulation of the improved landing gear is practically free of danger since the operator can always select that side which is not adjacent to a lane for moving traffic. Still another advantage of the improved landing gear is that the wheels 3 can be moved at the higher or lower speed by a person standing at either side of the vehicle. The aforedescribed transmission 4 is capable of furnishing satisfactory speed ratios as well as of transmitting high torque.

It is clear that the improved landing gear is susceptible of many modifications without departing from the spirit of the present invention. For example, each of the mechanisms 1 and 2 may include a rack and pinion drive, a winch or other means for moving the landing wheels into and away from engagement with the ground. Also, the input shaft can actuate a different transmission and the coupling 47, 49 between the shafts 17, 46 can be replaced with different types of couplings. Still further, the crank handles 6 can be replaced with wheels and the case 41 of the transmission 4 can be mounted on the semitrailer frame or on the mechanism 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. A landing gear for vehicles, particularly for semitrailers, comprising two supporting members; two discrete mechanisms each operative to move one of said supporting members into and away from engagement with the ground and each having a rotary-driven portion; a hollow rotary output shaft operatively connected with said driven portions; an input shaft axially movably received in and extending beyond the ends of said output shaft; a multispeed transmission arranged to respectively provide a lower speed and a higher speed torque-transmitting connection between said shafts in first and second axial positions of said input shaft; and means for rotating said input shaft.

2. A landing gear as defined in claim 1, wherein said transmission comprises an intermediate shaft, a first gear on said intermediate shaft, a pinion on said intermediate shaft, a second gear provided on said output shaft and meshing with said pinion, a third gear provided on said input shaft and meshing with said first gear in the first axial position of said input shaft, and coupling means connecting said input shaft with said output shaft in the second axial position of said input shaft.

3. A landing gear as defined in claim 2, wherein said coupling means includes said second and third gears.

4. A landing gear as defined in claim 1, wherein said input shaft comprises a hollow cylindrical portion and a tension rod received in and arranged to enhance the resistance of said cylindrical portion to torsional stresses.

5. A landing gear as defined in claim 4, wherein said input shaft further comprise s a solid rod-shaped portion connected with said tension rod and operatively connected with said transmission.

6. A landing gear as defined in claim 1, wherein said means for rotating the input shaft comprises at least one crank handle movable between collapsed and extended positions and secured to one end portion of said input shaft.

7. A landing gear as defined in claims 6, further comprising means for connecting said crank handle to said input shaft for axial movement therewith in the extended position of said crank handle.

8. A landing gear as defined in claim 1, wherein said supporting members are landing wheels and each of said mechanisms further comprises a tubular outer leg, an inner leg telescoped into said outer leg and connected with the respective landing wheel, and means for moving said inner leg with reference to said outer leg in response to rotation of the respective driven portion.

9. A landing gear as defined in claim 1, wherein said means for rotating said input shaft comprises two crank handles, one at each end of said input shaft.

10. A landing gear as defined in claim 1, wherein said transmission includes a case supported by one of said mechanisms.

* * * * *